Figure 2:
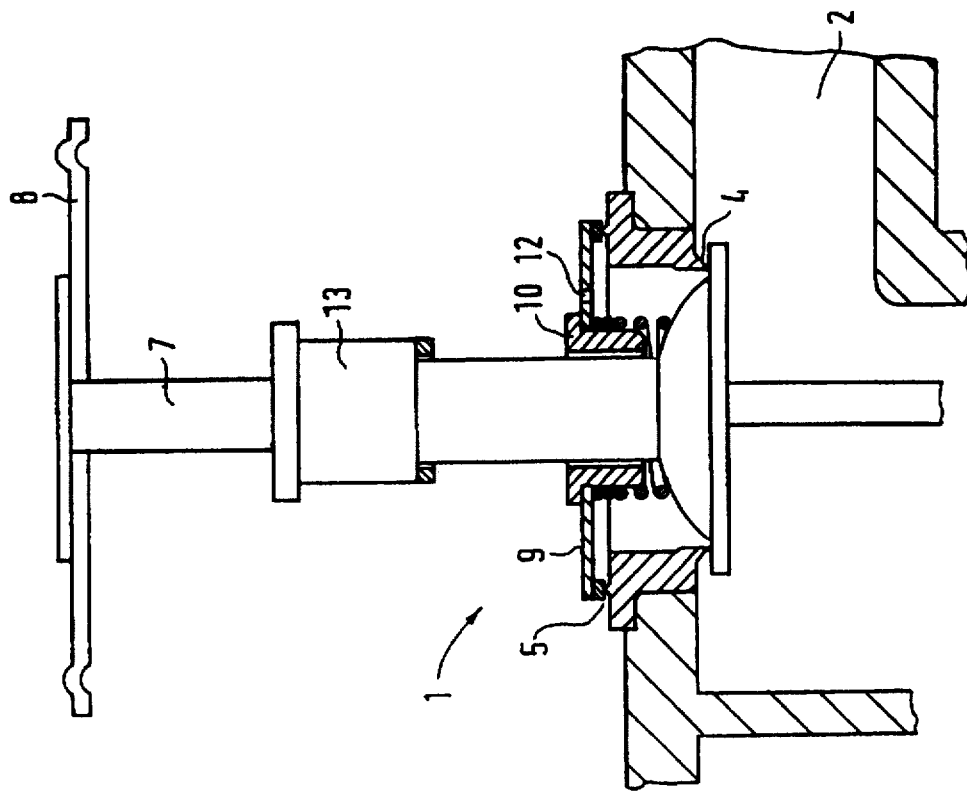

United States Patent
Kettner et al.

[11] Patent Number: 5,669,409
[45] Date of Patent: Sep. 23, 1997

[54] GAS-PRESSURE CONTROLLER

[75] Inventors: Thomas Kettner, Netzbach; George Welker, Westhofen, both of Germany

[73] Assignee: Elster Produktion GmbH, Germany

[21] Appl. No.: 537,653

[22] PCT Filed: Mar. 9, 1994

[86] PCT No.: PCT/EP94/00723

§ 371 Date: Oct. 10, 1995

§ 102(e) Date: Oct. 10, 1995

[87] PCT Pub. No.: WO94/24620

PCT Pub. Date: Oct. 27, 1994

[30] Foreign Application Priority Data

Apr. 13, 1993 [DE] Germany ............ 43 11 826.7

[51] Int. Cl.⁶ .................................................. G05D 16/06
[52] U.S. Cl. .................. 137/494; 137/513.3; 137/517; 137/614.18; 137/614.21
[58] Field of Search ........................... 137/494, 505, 137/505.13, 513.3, 517, 614.18, 614.21

[56] References Cited

U.S. PATENT DOCUMENTS

| | | | |
|---|---|---|---|
| 2,633,862 | 4/1953 | Dales | 137/614.21 X |
| 3,576,193 | 4/1971 | Rothfuss | 137/505.13 X |
| 4,174,731 | 11/1979 | Sturgis et al. | 137/513.3 X |

FOREIGN PATENT DOCUMENTS

| | | | |
|---|---|---|---|
| 77043 | 11/1961 | France | 137/614.21 |
| 2447573 | 8/1980 | France | |

Primary Examiner—Stephen M. Hepperle
Attorney, Agent, or Firm—Blakely Sokoloff Taylor & Zafman

[57] ABSTRACT

The gas-pressure controller according to the present invention is characterised in that an obturator disc (9) is connected to a valve spindle (7) on the inlet side so that it can move axially. The obturator disc (9) is pressed by an elastic component in the "open" direction and opens to give a flow channel (3) when the output pressure is above a minimum value. The obturator disc (9) closes off the flow channel (3) when the output pressure drops below the minimum value leaving an extremely small flow aperture (12). The gas-pressure controller proposed is intended for use in medium-pressure applications. The controller starts up again automatically after a gas failure.

7 Claims, 1 Drawing Sheet

GAS-PRESSURE CONTROLLER

DESCRIPTION

The present invention relates to a gas-pressure controller with a body, which has an inlet and an outlet, with a flow channel arranged between the inlet and the outlet, said flow channel having a valve seat on the outlet side and being governed by a valve disc, as well as with a valve spindle connecting the valve disc to a diaphragm.

Such gas-pressure controllers are used in low-pressure and medium-pressure applications.

When the gas-pressure controller is used in medium-pressure applications (from 100 mbar to 4 bar) it is necessary to arrange a safety shut-off valve upstream of the gas-pressure controller. The safety shut-off valve shuts off the gas supply to the gas-pressure controller automatically when the pressure at the outlet of the gas-pressure controller drops below a minimum value as a result of a shortage of gas (lower shut-off point) or when the outlet pressure exceeds a maximum value (upper shut-off point).

The fact that the safety shut-off valve has to be manually reset before the controller can be restarted is disadvantageous. This is particularly disadvantageous in the case of a shortage of gas because this occurs more frequently than too high a pressure at the outlet.

Thus, the object of the present invention was to develop a gas-pressure controller which automatically shuts off the supply of gas when the outlet pressure drops below a minimum value as a result of a shortage of gas and which automatically restarts gas supply when the minimum pressure is exceeded again.

This object is solved by the gas-pressure controller according to the present invention characterised in that an obturator disc is connected to a valve spindle on the inlet side so that it can move axially, that the obturator disc is pressed by an elastic component in the "open" direction and opens to give a flow channel provided with an obturator disc when the outlet pressure is above a minimum value and that the obturator disc substantially closes off the flow channel so that only an extremely small flow is possible when the outlet pressure falls below the minimum value.

Current safety standards require that the gas-pressure controller may only be restarted when the downstream consumers have been switched off. This requirement is met by the gas-pressure controller according to the present invention.

The safety feature for cases of gas shortage functions as follows:

When the inlet pressure drops, the outlet pressure also falls from a certain pressure onwards and the valve disc opens the flow channel more and more until the obturator disc finally closes the flow channel.

An extremely small amount of gas can still flow through the extremely small flow aperture. When the inlet pressure rises again, this extremely small amount of gas flows into the downstream pipe system. When all the consumers downstream of the gas-pressure controller are shut off, the outlet pressure can rise again and the valve disc and valve spindle lift whilst the obturator disc is kept in the closed position by the inlet pressure. Only when the valve disc moves into the closed position, can the pressure above and below the obturator disc equalise and the elastic component presses the obturator disc upwards.

A particular advantage is that a sudden passing of the inlet pressure to the outlet side is not possible. This avoids the danger of the outlet pressure temporarily exceeding the maximum pressure leading to the safety shut-off valve switching in the upper shut-off point and cutting off the supply of gas.

The flow rate of the gas-pressure controller is not substantially impaired by the obturator disc.

It is advantageous for the valve spindle to be provided with a stop for the obturator disc. With this solution the design is particularly simple.

One advantageous embodiment is characterised in that the extremely small flow aperture is designed in the form of a nozzle in the obturator disc. Thus, the extremely small flow aperture can be simply and accurately dimensioned. A flow rate of 30 litres per hour should not be exceeded.

It is advantageous if a guide sleeve is arranged between the obturator disc and the valve spindle.

The design is particularly simple if the elastic component rests on the valve disc.

The elastic component is preferably designed as a pre-tensioned pressure spring.

Figure 1:
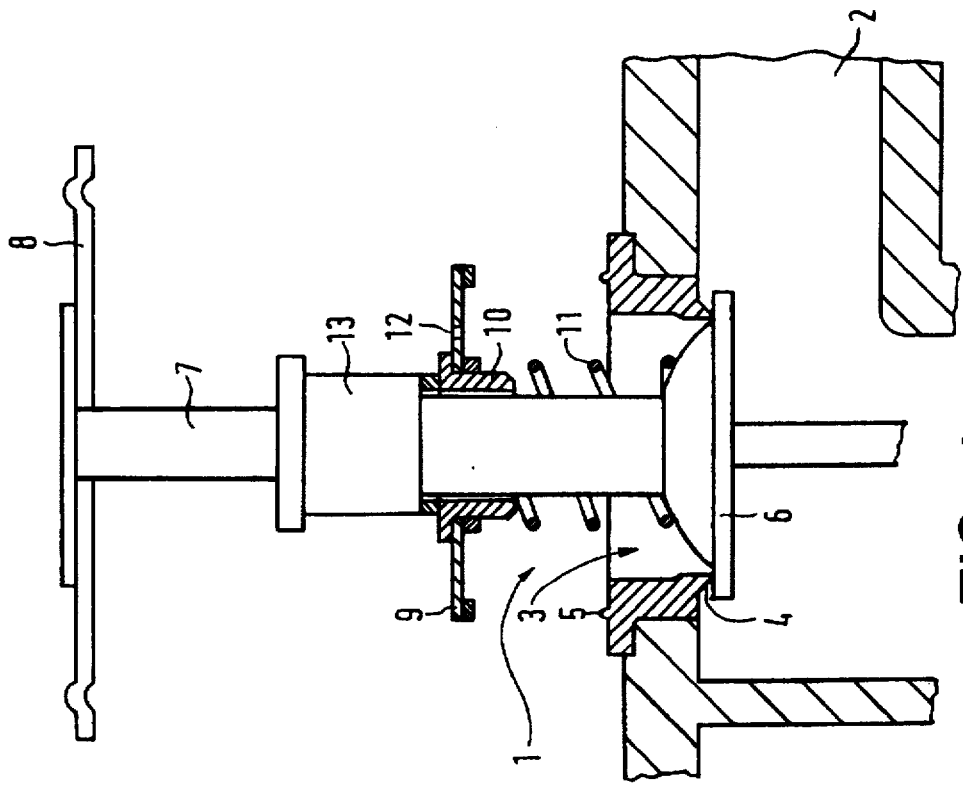

The present invention is explained in the following with the aid of a preferred embodiment of the gas-pressure controller according to the present invention and the attached drawing. The drawing shows in:

FIG. 1 a longitudinal section through a gas-pressure controller during a pressure regulating operation;

FIG. 2 a longitudinal section through a gas-pressure controller during restart.

The gas-pressure controller according to FIGS. 1 and 2 has a body not shown with an inlet 1 and an outlet 2. A flow channel 3 is arranged between inlet 1 and outlet 2, said flow channel having a valve seat 4 on the outlet side and an obturator disc seat 5 on the inlet side. The flow channel is governed by a valve disc 6, which is connected via a valve spindle 7 to a diaphragm 8.

On the inlet side, an obturator disc 9 is arranged on the valve spindle 7, said obturator disc 9 being connected via a guide sleeve 10 to said valve spindle 7 so that it can move axially. Between the obturator disc 9 and the valve disc 6 there is a pre-tensioned pressure spring 11 which rests on the valve disc 6. The obturator disc 9 has a nozzle 12 to allow the passage of extremely small flows of gas.

FIG. 1 shows that the pressure spring 11 presses the obturator disc 8 against an upper stop 13 on the valve spindle 6. In the pressure-relieved state the pretensioning of the pressure spring 11 must be greater than the weight of the obturator disc 9. During the normal regulating operation the obturator disc is held in the upper stop 13, the flow rate of the gas-pressure controller being hardly impaired by the obturator disc.

When a gas shortage occurs, the following happens: When the inlet pressure drops, the outlet pressure also falls from a certain pressure onwards. The valve disc 6 opens more and more until finally the obturator disc 9 rests on its seat 5 and shuts off the flow channel 3.

FIG. 2 shows the restarting of the gas-pressure controller. A consumer not shown in the Figure and located downstream of the gas-pressure controller is shut off. When pressure is applied to the inlet side, an extremely small amount of gas of maximum 30 litres per hour flows via a small nozzle 12 into a line (not shown) to the consumer. As the consumer is shut off, the outlet pressure can slowly build up. The valve spindle 7 lifts whilst the obturator disc 9 is kept in the closed position by the inlet pressure and the pressure spring 11 tensions. Only when the valve disc 6 rests in its seat 4 in the closed position does the pressure below and above the obturator disc 9 equalise and the pressure spring 11 presses the obturator disc 9 upwards. The gas-pressure controller is now in operation again.

What is claimed is:

1. A gas-pressure control apparatus comprising an inlet means;

an outlet means;

a flow channel arranged between said inlet means and said outlet means and having a valve seat means disposed at the outlet means side of said flow channel;

a valve disc means for governing a gas flow through said flow channel;

a valve spindle means arranged for axial movement relative to said valve seat means;

positioning means connected to said valve spindle means for positioning said valve disc means;

an obturator disc means coupled to said valve spindle means for relative axial movement thereto, said obturator disc means providing a very small flow aperture; and biasing means for biasing said obturator disc means into a first position in which said obturator disc means leaves said flow channel open, said biasing means cooperating with said obturator disc means in such a way that said obturator disc means is moved into a second position in which the obturator disc means engages an obturator disc seat for substantially closing said flow channel when a gas-pressure in said outlet means falls below a predetermined minimum value, said very small flow aperture defining a small fluid connection between said inlet means and said outlet means when said obturator disc means is in its second position.

2. The gas-pressure control apparatus according to claim 1 wherein said valve spindle means is provided with a stop means engaging said obturator disc means for limiting the axial movement at said first position.

3. The gas-pressure control apparatus according to claim 2 wherein said obturator disc means comprises an obturator disc held in position by a guide sleeve said guide sleeve being arranged for axial movement on said valve spindle means.

4. The gas-pressure control apparatus as defined in claim 1 wherein said obturator disc means comprises a nozzle forming said very small flow aperture.

5. The gas-pressure control apparatus as defined in claim 1 wherein said biasing means is formed by a pretensioned pressure spring.

6. The gas-pressure control apparatus according to claim 5 wherein said pressure spring rests on said valve disc.

7. The gas-pressure control apparatus as defined in claim 1 wherein said positioning means comprises a diaphragm which is connected to an actuating end of said valve spindle means.

* * * * *

UNITED STATES PATENT AND TRADEMARK OFFICE
CERTIFICATE OF CORRECTION

PATENT NO. : 5,669,409  
DATED : September 23, 1997  
INVENTOR(S) : Kettner et al.

Page 1 of 1

It is certified that error appears in the above-identified patent and that said Letters Patent is hereby corrected as shown below:

Title page,
Item [75], Inventors, delete inventor name "George Welker" and insert
-- Georg Welker --.
Item [21], Application Number, replace number "537,653" with -- 08/537,693 --.
Item [30], Foreign Application Priority Data, replace number "43 11 826.7" with
-- P 43 11 826.7 --.

Signed and Sealed this

Eighteenth Day of December, 2001

Attest:

Attesting Officer

JAMES E. ROGAN  
*Director of the United States Patent and Trademark Office*